United States Patent
Hamada et al.

(10) Patent No.: US 11,347,739 B2
(45) Date of Patent: May 31, 2022

(54) PERFORMING A CHAINED SEARCH FUNCTION

(71) Applicant: KABUSHIKI KAISHA TOSHIBA, Tokyo (JP)

(72) Inventors: Shinichiro Hamada, Fuchu Tokyo (JP); Kunio Osada, Fuchu Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 170 days.

(21) Appl. No.: 15/415,968

(22) Filed: Jan. 26, 2017

(65) Prior Publication Data

US 2017/0235793 A1   Aug. 17, 2017

(30) Foreign Application Priority Data

Feb. 15, 2016 (JP) .............................. JP2016-025593

(51) Int. Cl.
*G06F 16/24* (2019.01)
*G06F 16/2455* (2019.01)
*G06F 16/28* (2019.01)

(52) U.S. Cl.
CPC ........ *G06F 16/2455* (2019.01); *G06F 16/285* (2019.01)

(58) Field of Classification Search
CPC ........... G06F 17/30477; G06F 16/2455; G06F 16/285

(Continued)

(56) References Cited

U.S. PATENT DOCUMENTS 6,665,442 B2 * 12/2003 Sekiguchi .......... G06K 9/00744
382/224
2006/0167918 A1 * 7/2006 Tsuzuki .............. G06F 16/3338
(Continued)

FOREIGN PATENT DOCUMENTS

JP    2006-221355    8/2006
JP    2008-071112    3/2008
(Continued)

OTHER PUBLICATIONS

Parasuraman, May 2000, A Model for Types and Levels of Human Interaction with Automation vol. 30, No. 3, 286-287, and 294 (Year: 2000).*

*Primary Examiner* — Pierre M Vital
*Assistant Examiner* — Andrew N Ho
(74) *Attorney, Agent, or Firm* — Amin, Turocy & Watson, LLP

(57) ABSTRACT

A retrieval device includes a searching unit, an obtaining unit and a selecting unit. The searching unit searches a memory unit, which is stored object data that includes specific information identifying an object and attribute information indicating at least one of timing and position, for first object data containing specific information identical or similar to specified specific information. The obtaining unit obtains, from the memory unit, one or more sets of second object data which contains attribute information identical or similar to the attribute information included in the first object data and which contains specific information different than the specific information included in the first object data. The selecting unit selects one of the sets of second object data. The searching unit further searches for the first object data with the specific information included in the selected second object data serving as specified specific information.

16 Claims, 15 Drawing Sheets

(58) Field of Classification Search
USPC .......................................................... 707/738
See application file for complete search history.

(56) References Cited

U.S. PATENT DOCUMENTS

| | | | | |
|---|---|---|---|---|
| 2006/0251339 A1* | 11/2006 | Gokturk | ............. | G06K 9/00375 382/305 |
| 2007/0003140 A1* | 1/2007 | Yamada | ............. | G06F 16/5838 382/181 |
| 2007/0174272 A1* | 7/2007 | Carter | ...................... | G06K 9/72 |
| 2008/0052126 A1* | 2/2008 | Sasai | ..................... | G06F 19/321 705/3 |
| 2008/0304706 A1* | 12/2008 | Akisada | ............. | G06K 9/00771 382/103 |
| 2010/0046842 A1* | 2/2010 | Conwell | .................. | G06K 9/32 382/218 |
| 2010/0250601 A1* | 9/2010 | Takata | ................. | H04N 9/8205 707/780 |
| 2010/0318566 A1* | 12/2010 | Yoshio | ............... | G06K 9/00228 707/774 |
| 2011/0058028 A1* | 3/2011 | Sakai | ................. | G06K 9/00342 348/77 |
| 2011/0064319 A1* | 3/2011 | Momosaki | ............. | G11B 27/34 382/224 |
| 2013/0063581 A1* | 3/2013 | Komatsu | ............ | G06K 9/00288 348/77 |
| 2014/0126830 A1* | 5/2014 | Suganuma | ............. | G06K 9/622 382/225 |
| 2014/0205158 A1* | 7/2014 | Fukazawa | ............ | G06K 9/6218 382/118 |
| 2014/0324870 A1* | 10/2014 | Kami | ....................... | G06K 9/62 707/737 |

FOREIGN PATENT DOCUMENTS

| | | | |
|---|---|---|---|
| JP | 2008071112 A | * | 3/2008 |
| JP | 2008-204079 | | 9/2008 |
| JP | 2008-306604 | | 12/2008 |
| JP | 2013-101431 | | 5/2013 |
| JP | 2014-211730 | | 11/2014 |

* cited by examiner

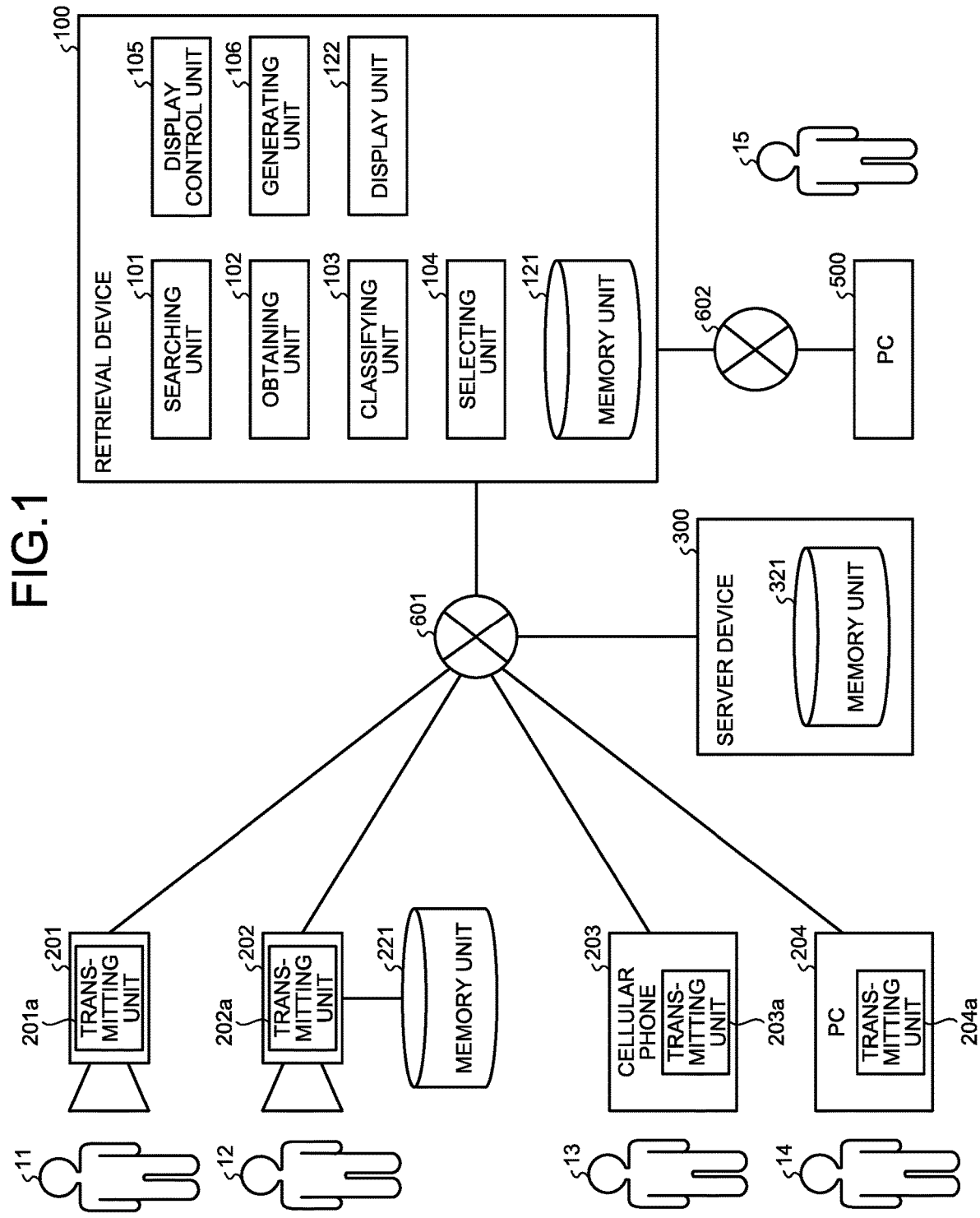

FIG.2

| TIMING | LATITUDE | LONGITUDE | NAME | FACE IMAGE |
|---|---|---|---|---|
| 1/13/2016 10:10:22 | 34.666000000 | 133.918000000 | YAMADA TARO | aaa.jpg |
| 1/13/2016 10:11:17 | 34.669000000 | 133.917000000 | SUZUKI HANAKO | bbb.jpg |
| 1/13/2016 11:38:26 | 34.667000000 | 133.924000000 | YAMADA TARO | ccc.jpg |

FIG.3

| TIMING | LATITUDE | LONGITUDE | LOGIN ID | MESSAGE |
|---|---|---|---|---|
| 1/13/2016 10:10:22 | 34.666000000 | 133.918000000 | YAMADA TARO | I HAVE REACHED THE STATION. |
| 1/13/2016 10:11:17 | 34.669000000 | 133.917000000 | SUZUKI HANAKO | I AM AT HOSPITAL NOW. |
| 1/13/2016 11:38:26 | 34.667000000 | 133.924000000 | YAMADA TARO | I AM HUNGRY. |

FIG.4

| TIMING | LATITUDE | LONGITUDE | LICENSE PLATE NUMBER | VEHICLE IMAGE |
|---|---|---|---|---|
| 1/13/2016 10:10:22 | 34.666000000 | 133.918000000 | TAMA 500 WA 46-49 | aaa.jpg |
| 1/13/2016 10:11:17 | 34.669000000 | 133.917000000 | KYOTO 500 WA 46-49 | bbb.jpg |
| 1/13/2016 11:38:26 | 34.667000000 | 133.924000000 | TAMA 500 WA 46-49 | ccc.jpg |

| TIMING | LATITUDE | LONGITUDE | FEATURE VECTOR | FACE IMAGE |
|---|---|---|---|---|
| 1/13/2016 10:10:22 | 34.666000000 | 133.918000000 | 1.1, 2.2, -3.3 | aaa.jpg |
| 1/13/2016 10:11:17 | 34.669000000 | 133.917000000 | 11.2, -12.3, 13.4 | bbb.jpg |
| 1/13/2016 11:38:26 | 34.667000000 | 133.924000000 | 1.0, 2.1, -3.2 | ccc.jpg |

PERFORMING A CHAINED SEARCH FUNCTION

CROSS-REFERENCE TO RELATED APPLICATION

This application is based upon and claims the benefit of priority from Japanese Patent Application No. 2016-025593, filed on Feb. 15, 2016, the entire contents of all of which are incorporated herein by reference.

FIELD

Embodiments described herein relate generally to a retrieval device, a retrieval method, and a retrieval system.

BACKGROUND

A search solution for finding a missing person, such as a lost person or a crime suspect, using a group of surveillance images obtained across town is in the process of being put in practical use. For example, a technology has been proposed in which, using images of the face or the full-length figure of a missing person as the lead, similar image patterns are retrieved from a stored group of surveillance images.

BRIEF DESCRIPTION OF THE DRAWINGS

FIG. 1 is a block diagram illustrating an exemplary configuration of a retrieval system according to a first embodiment;

FIG. 2 is a diagram illustrating examples of object data according to the first embodiment;

FIG. 3 is a diagram illustrating examples of object data according to the first embodiment;

FIG. 4 is a diagram illustrating examples of object data according to the first embodiment;

DETAILED DESCRIPTION

Figure 5:
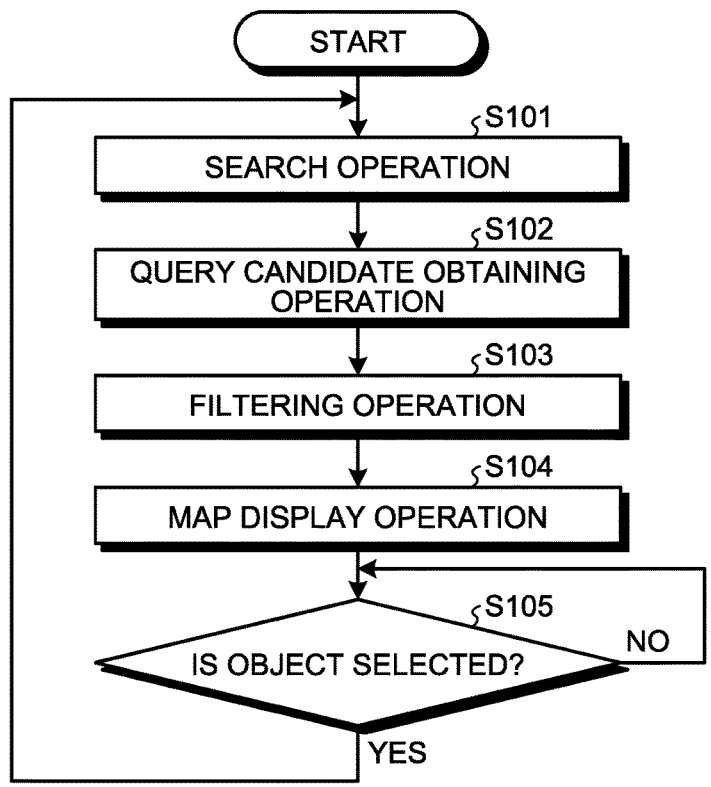
FIG. 5 is a flowchart for explaining an example of an associative search operation according to the first embodiment.

In the conventional technology, for example, it is not possible to search for a person concerned who is not the missing person but who is involved in the matter or incident of concern.

A retrieval device according to embodiments includes a searching unit, an obtaining unit, and a selecting unit. The searching unit searches a memory unit, which is configured to store object data in which specific information identifying objects is associated with attribute information indicating at least one of timings and positions, for first object data that contains specific information identical or similar to the specified specific information. The obtaining unit obtains, from the memory unit, one or more sets of second object data each of which contains attribute information identical or similar to the attribute information included in the first object data but which contains specific information different than the specific information included in the first object data. The selecting unit selects one of the sets of second object data. The searching unit further searches for the first object data with the specific information included in the selected second object data serving as the specified specific information.

Exemplary embodiments of a retrieval system according to the invention are described below in detail with reference to the accompanying drawings.

As described earlier, in the conventional technology, it is not possible to search for a person concerned who is not the missing person. For example, if a case of a missing child is a child abduction case, if the kidnapper happens to cover the child using a hood or the like, seeking the whereabouts of the child after the criminal has got in touch with it becomes a difficult task. In such a case, it becomes necessary to trace the criminal who got in touch with the child. As another example, while tracing a criminal suspect immediately after an incident, the presence and whereabouts of the involved people needs to be verified as part of dealing with the possibility of an organized crime.

The retrieval system according to the embodiments described below enables associative searching with respect to a data group associated with attribute information representing at least one of positions (position information) and timings (timing information). Herein, the data to be searched is sometimes called object data. The associative searching includes a common search function, an associative query presentation function, and a chained search function. The details of each function are given later. The associative searching makes it possible to search for a person concerned who is not the missing person.

Given below is the explanation of an example of each function of the associative searching. In the following explanation, an image pattern represents the target image area for searching. In the case of searching for a face image, the face area included in an image represents the image pattern. Meanwhile, there may be a plurality of image patterns in a single image.

(1) Normal Search Function

With an image pattern that is externally provided by the user serving as the query, a search for similar images is performed with respect to an image group of images having position information assigned thereto. Then, regarding each image pattern obtained as the search result, the image pattern and the image to which the image pattern belongs are placed on a map based on the position information assigned to the image.

(2) Associative Query Presentation Function (2-1) Regarding each image included in an image group (a first image group) including a plurality of image patterns obtained as the search result, an image group (a second image group) of positionally close images is retrieved.

(2-2) The second image group is placed on the map based on the position information assigned to the images.

(2-3) From an image pattern group obtained by detecting image pattern groups included in the first image group and the second image group, the image patterns not obtained as the result of the normal search are presented as associative queries selectable by the user.

(2-4) A user selection operation (such as a click) is received for one of the image patterns presented at the step (2-3), and the image pattern selected in the selection operation is set as the associative query.

(3) Chained Search Function

With the associative query specified in the operation (2) serving as the input, the operation (1) is performed again. Thus, the user can perform a repetitive chained search for a desired number of times.

In the example given above, an image group of positionally close images is retrieved based on the position information. That is, with the position information serving as the attribute information, an image group is retrieved that includes images having identical or similar positions indicated in the respective position information. However, the attribute information is not limited to the position information. Alternatively, the timing information indicating timings can be used as the attribute information, or the timing information along with the position information can be used as the attribute information.

Herein, identicalness or similarity of attribute information implies, for example, that the difference among a plurality of sets of attribute information is smaller than a threshold value. If the position information serves as the attribute information, identicalness or similarity of positions indicates that the difference (distance) among a plurality of positions is smaller than a threshold value. If the timing information serves as the attribute information, identicalness or similarity of timings indicates that the difference among a plurality of timings is smaller than a threshold value. If the position information and the timing information are used as the attribute information, identicalness or similarity of the attributed information indicates that the difference among the sets of position information and the difference among the sets of timing information are smaller than the respective threshold values.

Meanwhile, the value obtained by performing weighted addition of the degree of similarity of the timing information and the degree of similarity of the position information included in the attribute information can be set as the degree of similarity of the attribute information. In that case, if the weight of either the timing information or the position information is set to zero, then only the other information can be made to be considered as the attribute information.

In the embodiments, as a developmental function in addition to the functions of the associative searching, a function is provided in which, using the history of a chained search (for example, who was searched based on whom), a human relationship network is built and a visualization of that personal relationship network is created.

Herein, the scope of application of the retrieval system is not limited to searching for persons. Alternatively, for example, the retrieval system can be implemented in searching for arbitrary mobile objects such as vehicles or dogs. Moreover, although the target data (object data) group for searching is, for example, image data group (including still images and moving images) taken by surveillance cameras, that is not the only possible case. Alternatively, for example, tweet data having position information such as a geotag assigned thereto can be used as the object data group. Moreover, although the object data represents, for example, log data of image data or tweet data that is recorded as needed, that is not the only possible case.

As described above, the attribute information can indicate at least one of the timings and the positions. In the case of using only the timings as the attribute information, the configuration can be done to search for the data groups that are close on the time axis. In the case of using only the positions as the attribute information, the configuration can be done to search for the data groups that are close within a particular space. Herein, for example, the particular space is a real space (Euclidian space) expressed with the latitude and the longitude. However, that is not the only possible case. Alternatively, for example, it is possible to use a space indicating a road network, or a space indicating a railroad network, or a space indicating a computer network, or a virtual space built using a computer and so forth.

As described above, the retrieval system according to the embodiments is capable of searching for the object data and tracing an object moving in a space. The retrieval system according to the embodiments further has the function of finding, in an interactive and chained manner, highly-linked objects by considering the closeness in time and space. Regarding the general versatility of the mechanism, the specific explanation is given in the embodiments.

The following explanation is given about two types of retrieval systems, namely, a retrieval system that searches for labeled objects (a first embodiment) and a retrieval system that searches for unlabeled objects (a second embodiment). Herein, a label represents identification information, such as a name and an ID, that enables identification of an object.

First Embodiment

According to the first embodiment, the retrieval system searches for labeled objects. Given below are the application examples in which labeled objects are the targets for tracing.

Tracing of persons using surveillance images of an area such as an entertainment park or a factory in which visitors are managed.

Tracing of persons based on user-transmitted information (for example, a geotagged tweet, or play-log information of a position information game) having position information assigned thereto.

Tracing of vehicles on expressways in combination with license plate number recognition.

The following explanation is given with the focus on the example of tracing a person using surveillance images, and the other application examples are explained in a supplementary manner.

FIG. 1 is a block diagram illustrating an exemplary configuration of a retrieval system according to the first embodiment. As illustrated in FIG. 1, the retrieval system according to the first embodiment includes a retrieval device 100, cameras 201 and 202, a cellular phone 203, a personal computer (PC) 204, a server device 300, a PC 500, and networks 601 and 602.

The network 601 connects the retrieval device 100, the cameras 201 and 202, the cellular phone 203, the PC 204, and the server device 300 to each other. The network 602 connects the retrieval device 100 and the PC 500 to each other. The network configuration illustrated in FIG. 1 is only exemplary and is not limited to this example. Alternatively, for example, the networks 601 and 602 can be integrated, or at least one of the networks 601 and 602 can be further divided into a plurality of networks. The networks 601 and 602 can be configured in an arbitrary network form such as the Internet or a local area network (LAN).

The cameras 201 and 202 are imaging devices such as surveillance cameras that capture persons 11 and 12. The cameras 201 and 202 include transmitting units 201a and 202a, respectively. The transmitting units 201a and 202a transmit object data such as the taken images to the network 601. The camera 202 can also include a memory unit 221 for temporarily storing the taken images. Moreover, the transmitted object data can then be transmitted to a surveillance system and stored therein.

The cellular phone 203 and the PC 204 are information processing devices that transmit object data such as tweet data to the server device 300. As long as object data can be transmitted, an information processing device other than a cellular phone or a PC can also be used. The cellular phone 203 and the PC 204 include transmitting units 203a and 204a, respectively, for transmitting object data.

The server device 300 provides, for example, a service for sharing tweet data. The server device 300 includes a memory unit 321, which is used to store tweet data transmitted from the information processing devices (for example, the cellular phone 203 and the PC 204) that are used by the users (for example, persons 13 and 14) of the service.

The PC 500 is an exemplary information processing device meant for using the associative search performed in the retrieval device 100. For example, the PC 500 transmits, to the retrieval device 100, specific information of the object to be searched (such as the person to be traced) as input by a person 15 who is the user; and receives, from the retrieval device 100, the search result based on the specific information. The search result can be displayed on a display device of the PC 500.

The specific information enables identification of the object. When the object is labeled as is the case in the first embodiment, the label (identification information identifying the object) can be used as the specific information. If there is no label; then, for example, feature information indicating the features of the object can be set as the specific information.

The retrieval device 100 includes a memory unit 121, a display unit 122, a searching unit 101, an obtaining unit 102, a classifying unit 103, a selecting unit 104, a display control unit 105, and a generating unit 106.

The memory unit 121 is used to store a variety of data used in various operations performed by the retrieval device 100. For example, the memory unit 121 is used to store object data in which the specific information of objects is held in a corresponding manner to the attribute information of objects.

FIGS. 2 to 4 are diagrams illustrating examples of object data. In FIGS. 2 to 4 are illustrated examples in which the timings and the position information, which contains the latitudes and the longitudes, represent the attribute information. In the example illustrated in each of FIGS. 2 to 4, a name, a login ID and a license plate number represent labels (specific information), respectively.

In FIG. 2 is illustrated an example of log data in an application of tracing persons using surveillance images of an area such as an entertainment park or a factory in which visitors are managed. For example, from among the images taken by the surveillance cameras installed in the premises, the faces of persons are detected and recognized. The log data containing the photographing timings, the photographing positions (the latitudes and the longitudes), the names obtained as a result of face recognition, and the extracted face images is stored as records of a table.

In FIG. 3 is illustrated an example of log data in an application of tracing persons based on user-transmitted information (for example, a geotagged tweet, or play-log information of a position information game) having position information assigned thereto. For example, based on a geotagged message group posted in the service for sharing tweet data, the log data containing the message posting timings, the message posting positions (the latitudes and the longitudes), the login IDs of the poster users, and the posted messages is stored as records in a table.

In FIG. 4 is illustrated an example of log data in an application of tracing vehicles on expressways in combination with license plate number recognition. For example, from among the images taken by surveillance cameras installed at gates, license plates are detected and recognized. The log data containing the photographing timings, the photographing positions (the latitudes and the longitudes), the license plate numbers obtained as a result of license plate recognition, and the extracted vehicle images is stored as records of a table.

As illustrated in FIGS. 2 to 4, the object data contains a name, a login ID, and a license plate number that can be used as labels. Moreover, the object data contains an extracted face image, a message, and an extracted vehicle image as object contents. In the retrieval system according to the first embodiment, since an algorithm is implemented in which the timings, the positions, and the labels are used; any type of object data can be processed. The following explanation is mainly given for the example of the application of tracing persons using the log data of face recognition as illustrated in FIG. 2.

The memory unit 121 can be used to store, for example, the object data either collected in response to a specification from the administrator or collected periodically from the memory unit 321 of the server device 300.

Meanwhile, the memory units 121 and 321 can be configured using any commonly-used memory medium such as a hard disk drive (HDD), an optical disk, a memory card, or a random access memory (RAM).

The display unit 122 displays a variety of data used in various operations performed by the retrieval device 100. The display unit 122 can be configured using a liquid crystal display, for example. Meanwhile, if the configuration is such that the search result is displayed on, for example, the display device of the PC 500; then the display unit 122 may not be disposed in the retrieval device 100.

The searching unit 101 implements the normal search function. That is, the searching unit 101 searches the memory unit 121 for the object data (first object data) having the identical label to the specified label. A query used for a normal search (i.e., a normal query) can include, apart from including a label, a reference timing and a reference position. Herein, the reference timing implies the timing serving as the reference, and the reference position implies the position serving as the reference.

A normal query can be specified by the user of the PC 500 (i.e., by the person 15) and transmitted to the retrieval device 100, and can be input from an input interface of the retrieval device 100.

The searching unit 101 searches the log data in the memory unit 121 in response to the normal query that is input. Then, the searching unit 101 sends search result data, which is obtained as a result of performing the search, to the display control unit 105.

The display control unit 105 controls the display of a variety of data on the display unit 122. For example, the display control unit 105 places the search result data received from the searching unit 101 on a map, and displays the map on the display unit 122.

The obtaining unit 102 obtains, based on the search result data obtained by the searching unit 101, an object group including objects that are close in time and space and that have different labels. That is, the obtaining unit 102 obtains, from the memory unit 121, one or more sets of object data (second object data) that contain the attribute information identical to the attribute information included in the first object data and that contain labels different than the label included in the first object data. Then, the obtaining unit 102 outputs the obtained sets of second object data as an associative query candidate group.

The associating query candidate group also includes such objects which, for example, only temporarily moved close to the object specified in the normal query. In that regard, an operation (a filtering operation) can be performed to eliminate such objects and to narrow down the associative query candidate group. However, the filtering operation is not mandatory. Thus, if the filtering operation is not performed, the associative query candidate group can be used without modification in subsequent operations.

The classifying unit 103 classifies, for the purpose of the filtering operation, the associative query candidates into one or more groups of associative query candidates having identical or similar attribute information. For example, the classifying unit 103 classifies the associative query candidates into groups of associative query candidates having identical labels.

If the filter operation is performed, then the obtaining unit 102 can further obtain the associative query candidates included in the group that is selected based on the number of associative query candidates classified therein (for example, the group having a greater number of associative query candidates than the other groups). For example, the obtaining unit 102 can select the group in which the number of associative query candidates is equal to or greater than a threshold value or can select a predetermined number of groups in descending order of the number of associative query candidates classified therein, and can obtain the associative query candidates included in the selected group. As a result, the associative query candidate group can be narrowed down to only such objects which have a high frequency of moving close to the object specified in the normal query. As a result of performing this operation, it becomes possible to narrow down to the objects having a high likelihood of being related to the object specified in the normal query.

Meanwhile, for example, in the case of tracing a person who is identified from a moving image, having a large number of associative query candidates implies that there are a large number of frames constituting the moving image. In other words, having a large number of associative query candidates implies that the total of the periods of time for which the objects moved closer to the object specified in the normal query (i.e., the total period of time) is large. Thus, as a result of performing the filtering operation, the associative query candidate group can be narrowed down to such objects for which the total of the periods of time for which those objects moved closer to the object specified in the normal query is large.

The display control unit 105 places the associative query candidate group, which is obtained by the obtaining unit 102, on a map and displays the map on the display unit 122.

The selecting unit 104 selects one of the associative query candidates. For example, the selecting unit 104 selects the associative query candidate that is specified by the user on the map displayed on the display unit 122, and sets the selected associative query candidate as an associative query.

Then, the searching unit 101 specifies the label of the object selected as an associative query and again searches the memory unit 121 for the log data. In this way, the associative query presentation function and the chained search function are implemented. The sequence of operations explained above can be repeated as much as the user wants.

Based on the history of normal queries and associative queries during a series of user search operations, the generating unit 106 generates information indicating the relationship between the objects specified in the queries. That is, the generating unit 106 generates information indicating the objects specified in normal queries (i.e., first objects), generates information indicating the objects selected as associative queries (i.e., second objects), and generates information associating the two types of objects. For example, the generating unit 106 treats the objects specified in normal queries as dependency sources, treats the objects selected as associative queries as dependency destinations, and generates information indicating a relationship network between the two types of objects. Then, the display control unit 105 can display the generated information on the display unit 122.

Meanwhile, the abovementioned constituent elements (the searching unit 101, the obtaining unit 102, the classifying unit 103, the selecting unit 104, the display control unit 105, and the generating unit 106) can be implemented by making one or more processors such as a central processing unit (CPU) to execute computer programs, that is, can be implemented using software; or can be implemented using hardware; or can be implemented using a combination of software and hardware.

Explained below with reference to FIG. 5 is an associative search operation performed by the retrieval device 100 configured in the abovementioned manner according to the first embodiment. FIG. 5 is a flowchart for explaining an example of the associative search operation according to the first embodiment.

Firstly, the searching unit 101 performs the search operation (a normal search) (Step S101). Then, the obtaining unit 102 performs a query candidate obtaining operation (Step S102). Subsequently, the classifying unit 103 performs a filtering operation (Step S103). Then, the display control unit 105 performs a map display operation (Step S104).

Subsequently, for example, the searching unit 101 determines whether or not an object is selected on the map (Step S105). If no object is selected yet (No at Step S105), then the operation is repeated until an object is selected. When an object is selected (Yes at Step S105), the system control returns to Step S101, and a normal search is performed again and the subsequent operations are repeated.

Figure 6:
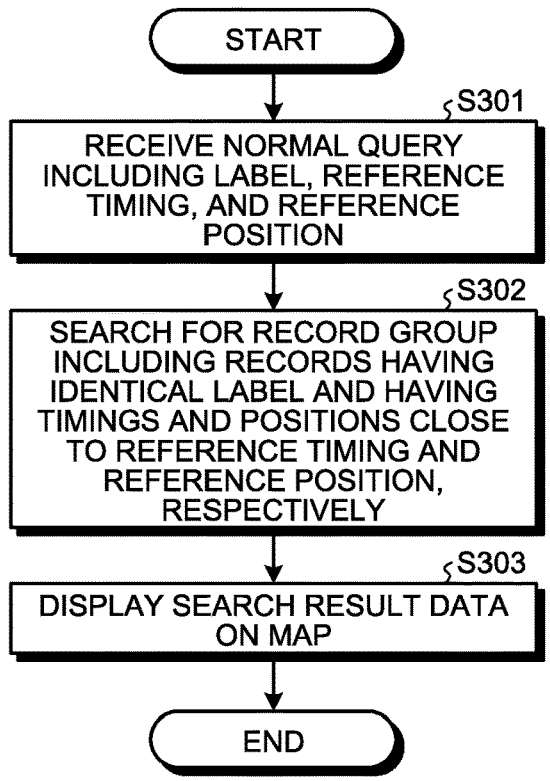
FIG. 6 is a flowchart for explaining an example of a search operation according to the first embodiment.

Given below is the detailed explanation of the operations (from Steps S101 to Step S104) illustrated in FIG. 5. FIG. 6 is a flowchart for explaining an example of the search operation performed at Step S101.

The searching unit 101 receives a normal query including a label, the reference timing, and the reference position (Step S301). Then, the searching unit 101 searches the log data stored in the memory unit 121 for a record group including records that have an identical label to the label specified in the normal query and that have the timings and the positions close to the reference timing and the reference position, respectively, specified in the normal query; and outputs the retrieved record group as search result data (Step S302).

For example, depending on whether or not the time difference is equal to or smaller than a threshold value and whether or not the positional distance is equal to or smaller than a threshold value, the searching unit 101 determines whether or not a timing and a position are close to the reference timing and the reference position, respectively. In the case of a Euclidian space such as a normal map, the Euclidian distance or the geodesic distance can be used as the positional distance. In the case of a network space such as expressways or a computer network, the shortest path distance or the hop count can be used as the positional distance.

The display control unit 105 displays the obtained search result data on a map (Step S303). An example of a display screen and a specific example of a display operation are explained later.

Figure 7:
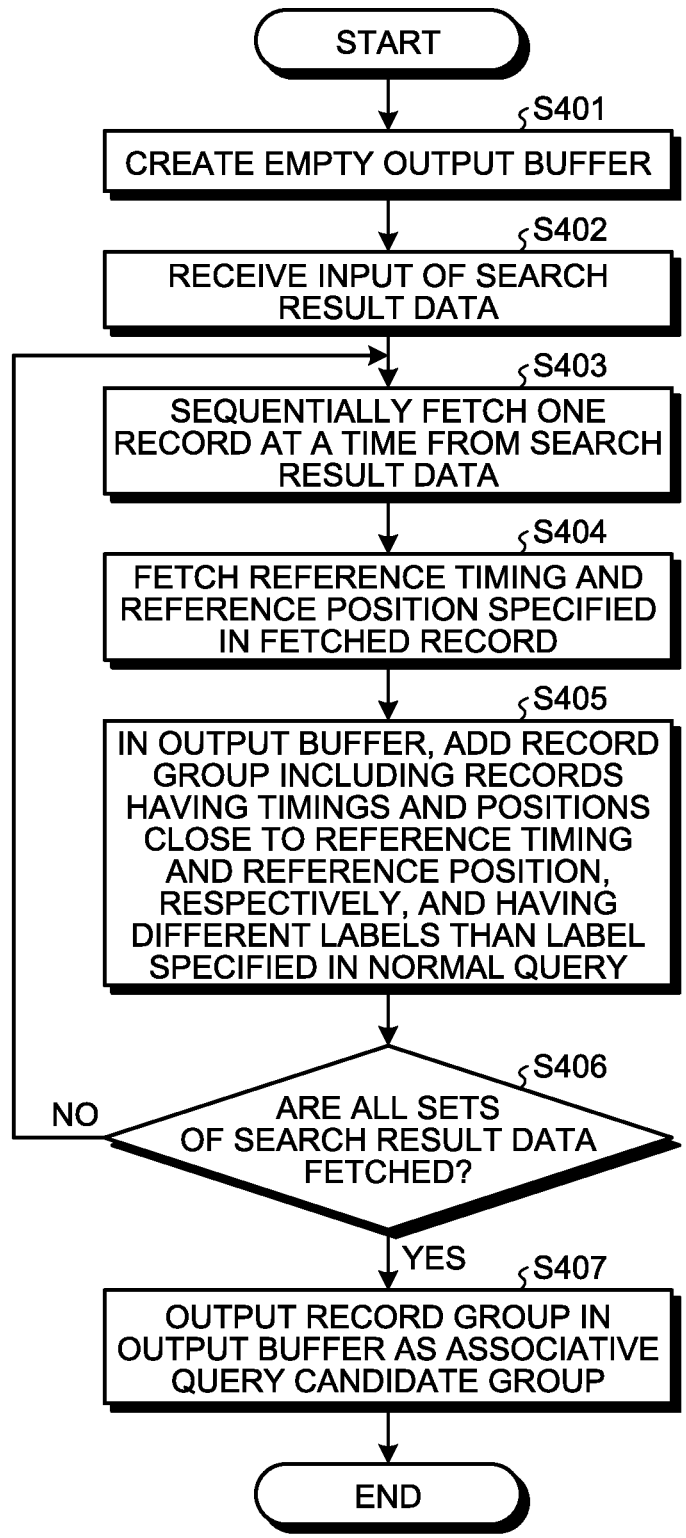
FIG. 7 is a flowchart for explaining an example of a query candidate obtaining operation according to the first embodiment.

FIG. 7 is a flowchart for explaining an example of the query candidate obtaining operation performed at Step S102.

The obtaining unit 102 creates an empty output buffer (Step S401). The output buffer is created in, for example, a memory medium such as a RAM or the memory unit 121 of the retrieval device 100.

The obtaining unit 102 receives input of the search result data from the searching unit 101 (Step S402). Then, the obtaining unit 102 sequentially fetches one record at a time from the search result data (Step S403). Subsequently, the obtaining unit 102 fetches the reference timing and the reference position specified in the fetched record (Step S404). Then, the obtaining unit 102 obtains, from the log data stored in the memory unit 121, a record group including records that have the timings and the positions close to the reference timing and the reference position, respectively, and that have different labels than the label specified in the normal query; and adds the record group in the output buffer (Step S405).

The obtaining unit 102 determines whether or not all sets of search result data are fetched (Step S406). If all sets of search result data are not yet fetched (No at Step S406), then the system control returns to Step S403 and the operations are repeated.

When all sets of search result data are fetched (Yes at Step S406), the obtaining unit 102 outputs the record group in the output buffer as an associative query candidate group (Step S407). It marks the end of the query candidate obtaining operation.

Meanwhile, at Step S405, it is alternatively possible to obtain, as the associative query candidates, the log data having the identical timing and the identical position to the reference timing and the reference position, respectively, that is, to obtain only the objects at the identical timing and the identical location. In that case, an object group is obtained that includes objects which are captured in the same surveillance image in which the object specified in the normal query is captured but which have different labels.

Figure 8:
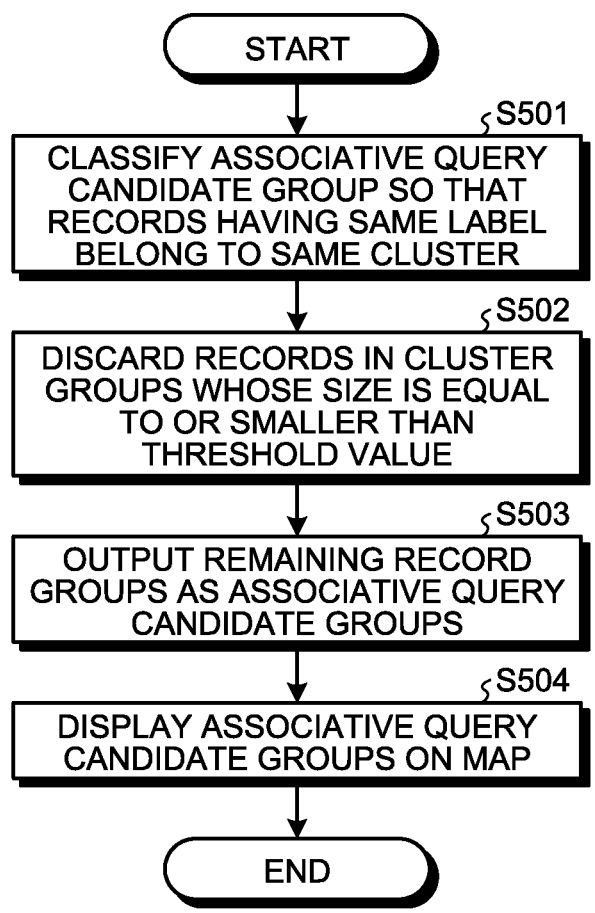
FIG. 8 is a flowchart for explaining an example of a filtering operation according to the first embodiment.

FIG. 8 is a flowchart for explaining an example of the filtering operation performed at Step S103.

The classifying unit 103 classifies the associative query candidate group in such a way that the records having the same label belong to the same cluster (an example of a group) (Step S501). From among cluster groups that are formed, the obtaining unit 102 discards the records in such cluster groups whose size is equal to or smaller than a threshold value (Step S502). The obtaining unit 102 outputs the remaining record groups as the associative query candidate groups (Step S503). The display control unit 105 places the associative query candidate groups on a map and displays the map on the display unit 122 (Step S504). An example of the display screen and a specific example of a display operation are explained later.

Figure 9:
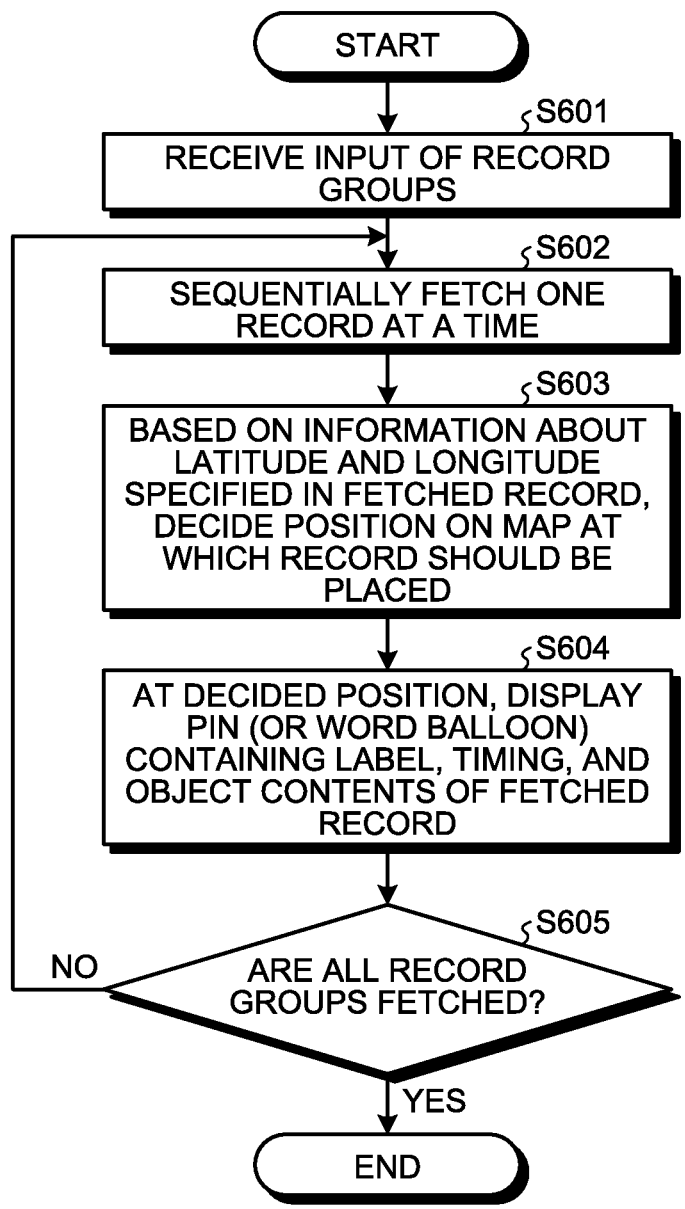
FIG. 9 is a flowchart for explaining an example of a map display operation according to the first embodiment.

FIG. 9 is a flowchart for explaining an example of the map display operation performed at Step S104.

The display control unit 105 receives input of record groups (associative query candidate groups) (Step S601). Then, the display control unit 105 sequentially fetches one record at a time (Step S602). Based on the information on the latitude and the longitude specified in the fetched record, the display control unit 105 decides the position on the map at which the record should be placed (Step S603). The display control unit 105 displays record information (such as a pin or a word balloon) containing the label, the timing, and the object contents (in the case of tracing a person, the extracted face image) of the fetched record at the decided position (Step S604).

The display control unit 105 can vary the display format (for example, the shape, the size, the color, the brightness, and blinking or no blinking) of the record information according to the type of the object. For example, the display control unit 105 displays the record information by varying its expression so as to enable distinction between whether the record represents the search result data retrieved by performing a normal search or represents an associative candidate group. Moreover, the display control unit 105 can display the record information of a later timing in a brighter color.

The display control unit 105 determines whether or not all record groups are fetched (Step S605). If all record groups are not yet fetched (No at Step S605), the system control returns to Step S602 and the operations are repeated. When all record groups are fetched (Yes at Step S605), it marks the end of the map display operation.

Meanwhile, based on the information about the record information groups that have been placed, the display control unit 105 can indicate the flow of movement using arrows. For example, the display control unit 105 can classify the record information groups according to the time slots, calculate the center of the position of the record information belonging to each time slot, and display a spline curve joining the centers.

When there is a plurality of objects at the identical timing and the identical location, that is, when the objects in the same image are to be displayed; the display control unit 105 can share the record information and display two objects in a single image.

Figure 10:
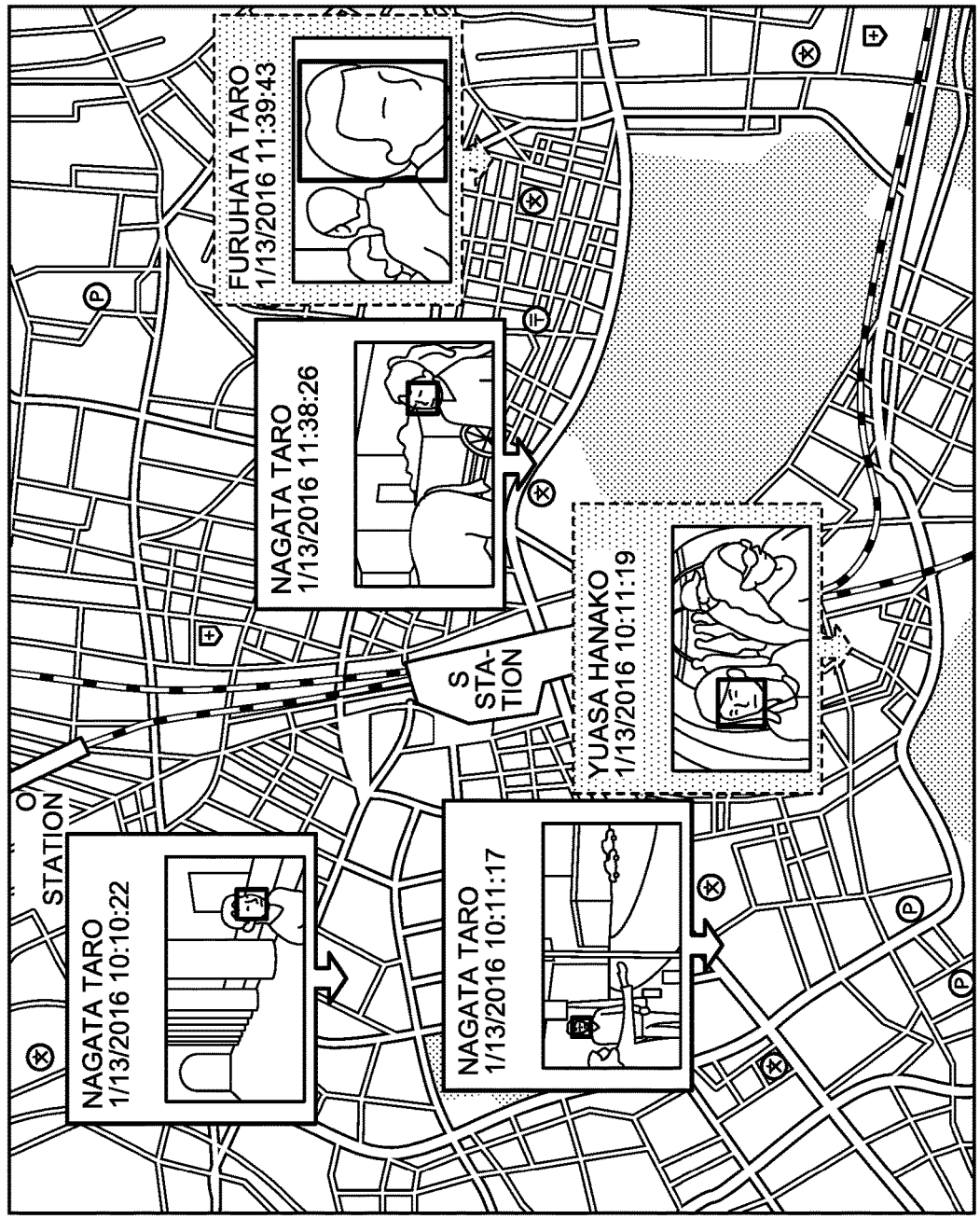
FIG. 10 is a diagram illustrating an example of a display screen according to the first embodiment.

FIG. 10 is a diagram illustrating an example of a display screen according to the first embodiment. In the display screen illustrated in FIG. 10, three sets of record information are displayed regarding "Nagata Taro", one set of record information is displayed regarding "Furuhata Taro", and one set of record information is displayed regarding "Yuasa Hanako". The sets of record information regarding "Nagata Taro" represent the search results in response to normal queries, while the other sets of record information represent an associative query candidate group. As illustrated in FIG. 10, each set of the record information in the associative query candidate group is enclosed in a dashed line. The display format such as the background color of the record information representing the associative query candidate group can be varied from the record information representing search results in response to normal queries.

For example, on the display screen as illustrated in FIG. 10, if the user clicks any one set of record information in the record information group, the selecting unit 104 selects the associative query candidate corresponding to the clicked record information as an associative query and outputs that associative query. The output associative query is then transmitted to the searching unit 101. Moreover, to the generating unit 106, a pair of the output associative query and the original normal query is transmitted.

Figure 11:
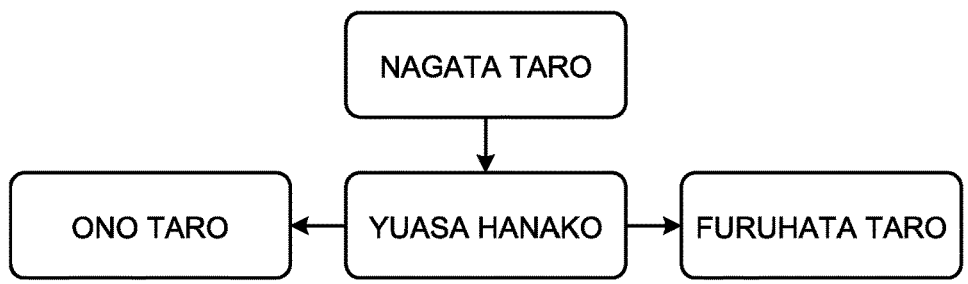
FIG. 11 is a diagram illustrating an exemplary object relationship diagram according to the first embodiment.

Based on the information transmitted thereto, the generating unit 106 generates information (an object relationship diagram) indicating the relationship among the objects specified in the queries. FIG. 11 is a diagram illustrating an exemplary object relationship diagram generated by the generating unit 106.

The object relationship diagram illustrated in FIG. 11 is generated in the following case. Firstly, a normal search is performed for "Nagata Taro". Then, a normal search is performed for "Yuasa Hanako" obtained as an associative query in the earlier search. Moreover, a normal search is performed for "Ono Taro" and "Furuhata Taro" obtained as associative queries in the earlier search.

The object relationship diagram illustrated in FIG. 11 is generated from only the search history. However, it also carries the meaning of a diagram indicating whether or not objects are close to each other. In this example, "Yuasa Hanako" is the person who has moved close to all other persons. Although the interpretation of the object relationship diagram is subject to the user, it is possible to interpret, for example, that "Yuasa Hanako" is the central figure in this network of persons. As a result of utilizing the object relationship diagram from this perspective, it becomes possible to be of some help in fully cracking a crime organization, for example.

Figure 12:
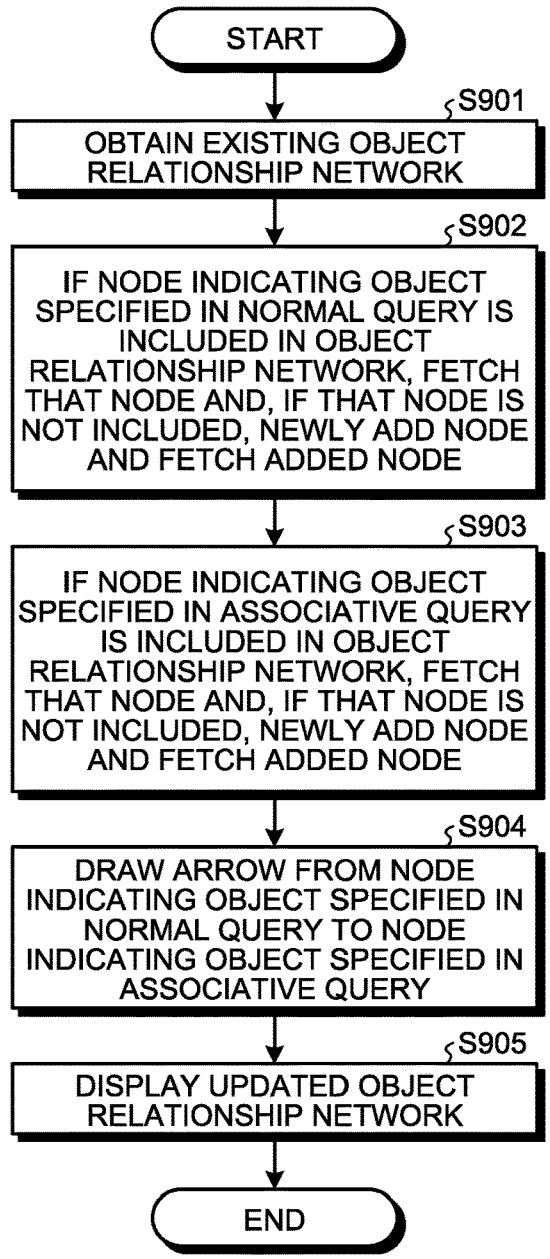
FIG. 12 is a flowchart for explaining an example of a generation operation according to the first embodiment.

FIG. 12 is a flowchart for explaining an example of the generation operation performed by the generating unit 106.

The generating unit 106 obtains an existing object relationship network (an example of the object relationship diagram) (Step S901). For example, the object relationship network is a directed graph made of nodes having the labels of objects.

If the node indicating the object specified in a normal query is included in the object relationship network, then the generating unit 106 fetches that node. However, if that node is not included, then the generating unit 106 newly adds a node and fetches it (Step S902).

If the node indicating the object specified in an associative query is included in the object relationship network, then the generating unit 106 fetches that node. However, if that node is not included, then the generating unit 106 newly adds a node and fetches it (Step S903).

Then, from the node that is fetched at Step S902 and that indicates the object specified in the normal query, the generating unit 106 draws an arrow to the node that is fetched at Step S903 and that indicates the object specified in the associative query (Step S904).

The display control unit 105 displays the updated object relationship network on the screen of the display unit 122 (Step S905).

Second Embodiment

According to a second embodiment, the retrieval system searches for unlabeled objects. Given below are the application examples in which unlabeled objects are the targets for tracing.

Tracing of persons or animals using surveillance images of an area such as a town or a railway station in which free movement is possible.

Tracing of vehicles on ordinary roads not in combination with license plate number recognition.

The following explanation is given with the focus on the example of tracing a person using surveillance images. As compared to the first embodiment, the second embodiment differs in the way that the determination condition using identicalness of labels is changed to the determination condition using closeness of the distances of feature vectors (an example of feature information), and that no labels are used in the display of the search result. In the case of an unlabeled object, feature information representing the features of the object can be used as the specific information.

Figures 13, 14:
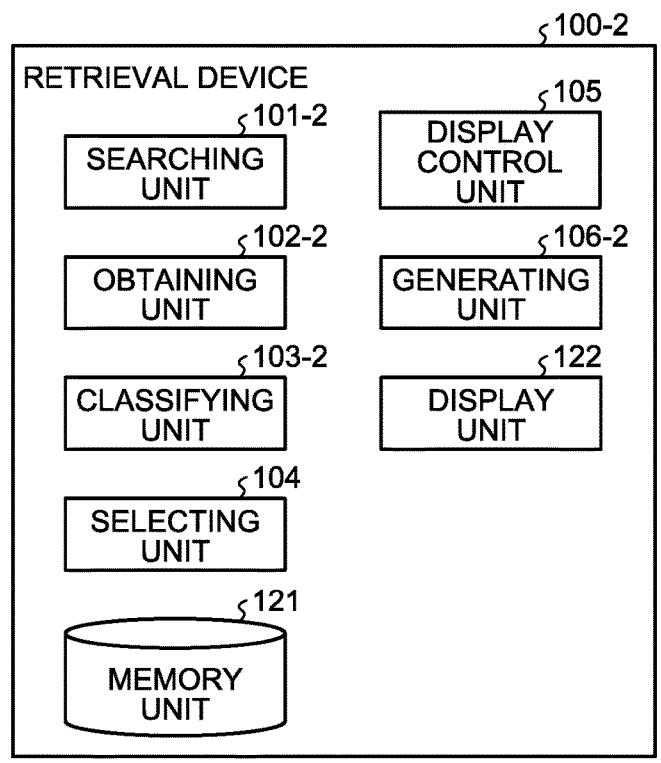
FIG. 13 is a block diagram illustrating an exemplary configuration of a retrieval device according to a second embodiment.
FIG. 14 is a diagram illustrating an example of object data according to the second embodiment.

FIG. 13 is a block diagram illustrating an exemplary configuration of a retrieval device 100-2 according to the second embodiment. The devices other than the retrieval device 100-2 are identical to the first embodiment (FIG. 1). Hence, neither those devices are illustrated in FIG. 13 nor their explanation is given.

As illustrated in FIG. 13, the retrieval device 100-2 includes the memory unit 121, the display unit 122, a searching unit 101-2, an obtaining unit 102-2, a classifying unit 103-2, the selecting unit 104, the display control unit 105, and a generating unit 106-2.

In the second embodiment, the data structure of the object data stored in the memory unit 121 is different than in the first embodiment; as well as the searching unit 101-2, the obtaining unit 102-2, the classifying unit 103-2, and the generating unit 106-2 are different than the first embodiment. The remaining configuration and functions are identical to FIG. 1 illustrating a block diagram of the retrieval device 100 according to the first embodiment. Hence, the same reference numerals are used and the explanation is not repeated.

FIG. 14 is a diagram illustrating an example of the object data according to the second embodiment. In FIG. 14 is illustrated the log data in an application of tracing persons using surveillance images of an area such as a town or a railway station in which free movement is possible. For example, from among the images taken by the surveillance cameras installed in the town, the faces of persons are detected and recognized. The log data containing the photographing timings, the photographing positions (the latitudes and the longitudes), the feature vectors obtained as a result of face recognition, and the extracted face images is stored as records of a table. As compared to the log data according to the first embodiment, the difference in the log data is that the column of labels (for example, names) is not present but a column of feature vectors is added.

Returning to the explanation with reference to FIG. 13, as compared to the searching unit 101 according to the first embodiment, the difference is that the searching unit 101-2 does not search for the object data having the identical label to the specified label but instead searches for the object data having feature information identical or similar to the specified feature information (an example of the specific information).

The obtaining unit 102-2 obtains, based on the search result data obtained by the searching unit 101-2, an object group including objects that are close in time and space and that are not included in the search result data. That is, the obtaining unit 102-2 obtains, from the memory unit 121, the object data (second object data) that contains the attribute information identical or similar to the attribute information included in the first object data but that is other than the first object data. Then, the obtaining unit 102-2 outputs the obtained second object data as an associative query candidate group.

As compared to the classifying unit 103 according to the first embodiment, the difference is that the classifying unit 103-2 performs classification using the similarity among the feature information (such as the feature vectors) instead of using the similarity among the labels. For example, the classifying unit 103-2 interprets that the objects having mutually similar feature vectors are identical objects (e.g. the same person). The degree of similarity among feature vectors can be determined according to, for example, the shortness of the distance among the feature vectors. However, the method for determining the degree of similarity among feature vectors is not limited to that example, and it is possible to implement any conventional method. For example, the inner product of feature vectors can be used in the determination.

As compared to the generating unit 106 according to the first embodiment, the difference is that the generating unit 106-2 generates information indicating the relationship among objects using the object contents instead of using the labels. For example, when image data represents the log data, images (for example, face images or vehicle images) can be used instead of labels. When tweet data represents the log data, messages can be used instead of labels.

Given below is the explanation of an associative search operation performed by the retrieval device 100-2 configured in the abovementioned manner according to the second embodiment. The overall flow of the associative search operation is identical to that of the associative search operation (FIG. 5) according to the first embodiment. In the second embodiment, the search operation performed at Step S101, the query candidate obtaining operation performed at Step S102, and the filtering operation performed at Step S103 are different than the first embodiment. Those operations are explained below.

Figure 15:
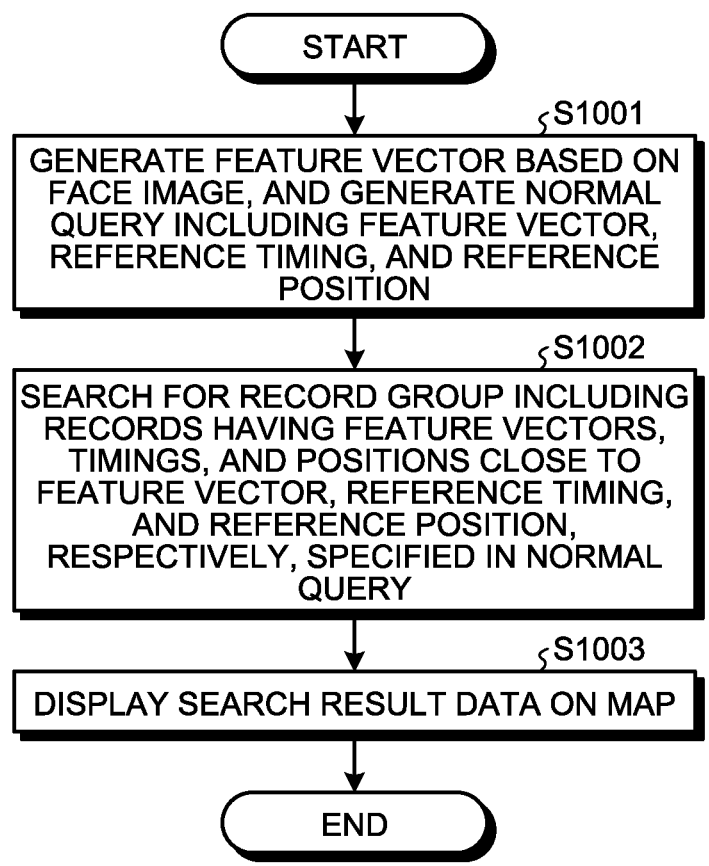
FIG. 15 is a flowchart for explaining an example of a search operation according to the second embodiment.

FIG. 15 is a flowchart for explaining an example of the search operation according to the second embodiment.

When a face image, the reference timing, and the reference position are input by the user, the searching unit 101-2 generates a feature vector based on the face image and generates a normal query including the feature vector, the reference timing, and the reference position (Step S1001). As far as the feature vector is concerned, it is possible to use any of the conventional feature quantities such as the co-occurrence histograms of oriented gradients (CoHOG), the scale-invariant feature transform (SIFT), or the speeded up robust features (Surf).

The searching unit 101-2 searches the log data stored in the memory unit 121 for a record group including records that include feature vectors identical or similar to the feature vector specified in the normal query and that have timings and positions close to the reference timing and the reference position specified in the normal query; and outputs the record group as the search result data (Step S1002).

For example, the searching unit 101-2 determines whether or not feature vectors are similar by determining whether or not the Euclidian distance is equal to smaller than a threshold value. Moreover, the searching unit 101-2 determines whether or not the timing and the position are close by determining whether or not the time difference is equal to or smaller than a threshold value and whether or not the positional distance is equal to or smaller than a threshold value.

The display control unit 105 displays the obtained search result data on a map (Step S1003). An example of the display screen is explained later.

Meanwhile, at Step S1001, although it is assumed that the user inputs a face image serving as the basis for generating a query, a feature vector may be input instead of a face image. Moreover, in the positional distance model considered at Step S1002, the Euclidian distance is used in the case of a Euclidian space such as a normal map, or the shortest way is used in the case of a topological space such as a road network or a railroad network.

Figure 16:
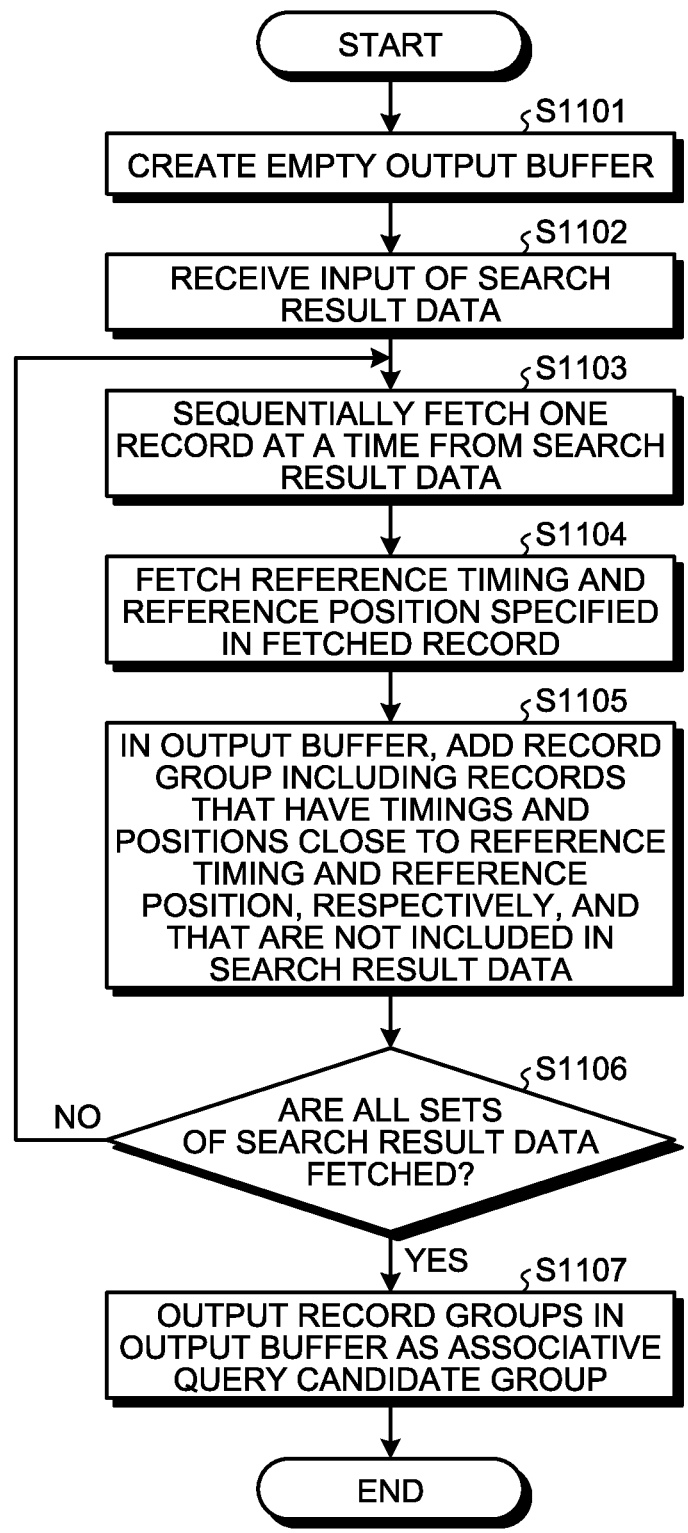
FIG. 16 is a flowchart for explaining an example of a query candidate obtaining operation according to the second embodiment.

FIG. 16 is a flowchart for explaining an example of the query candidate obtaining operation according to the second embodiment. Herein, the operations from Steps S1101 to S1104 are identical to the operations from Steps S401 to S404 illustrated in FIG. 7. Hence, that explanation is not repeated.

The obtaining unit 102-2 obtains, from the log data stored in the memory unit 121, the record group including such records which have the timings and the positions close to the fetched reference timing and the fetched reference position, respectively, and which are not included in the search result data; and adds the record group in the output buffer (Step S1105).

The operations at Steps S1106 and S1107 are identical to the operations at Steps S406 and S407. Hence, that explanation is not repeated.

Meanwhile, at Step S1105, it is alternatively possible to obtain, as the associative query candidates, the log data having the identical timing and the identical position to the reference timing and the reference position, respectively, that is, to obtain only the objects at the identical timing and the identical location. In that case, an object group is obtained that includes objects which are captured in the same surveillance image in which the object specified in the normal query is captured.

Figure 17:
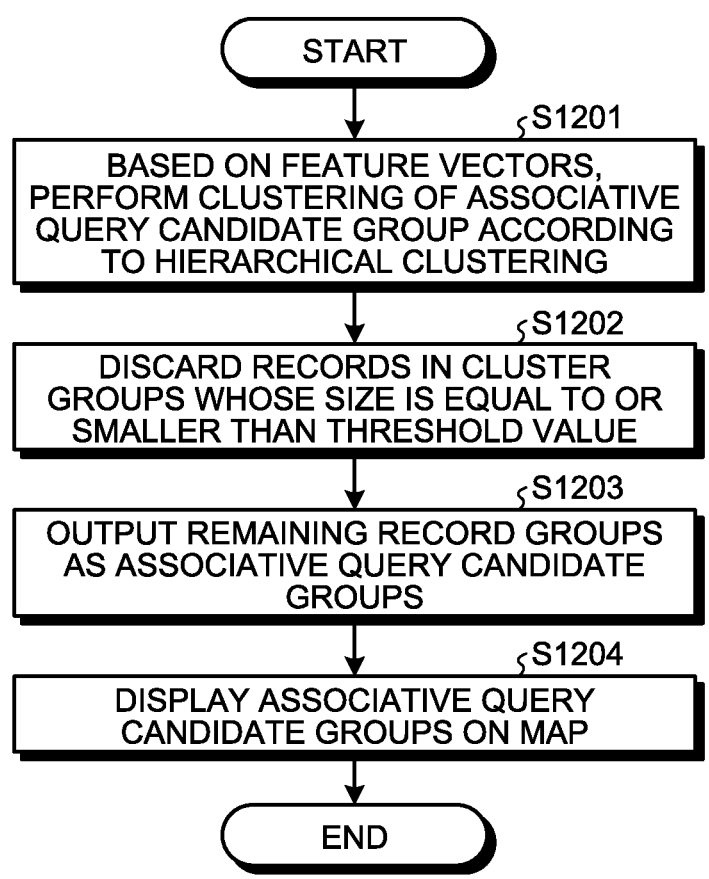
FIG. 17 is a flowchart for explaining an example of a filtering operation according to the second embodiment.

FIG. 17 is a flowchart for explaining an example of the filtering operation according to the second embodiment.

Based on the feature vectors, the classifying unit 103-2 performs clustering of the associative query candidate group into one or more clusters (an example of groups) according to a clustering method such as hierarchical clustering (Step S1201).

The operations from Steps S1202 to S1204 are identical to the operations from Steps S502 to S504 illustrated in FIG. 8. Hence, that explanation is not repeated.

Figure 18:
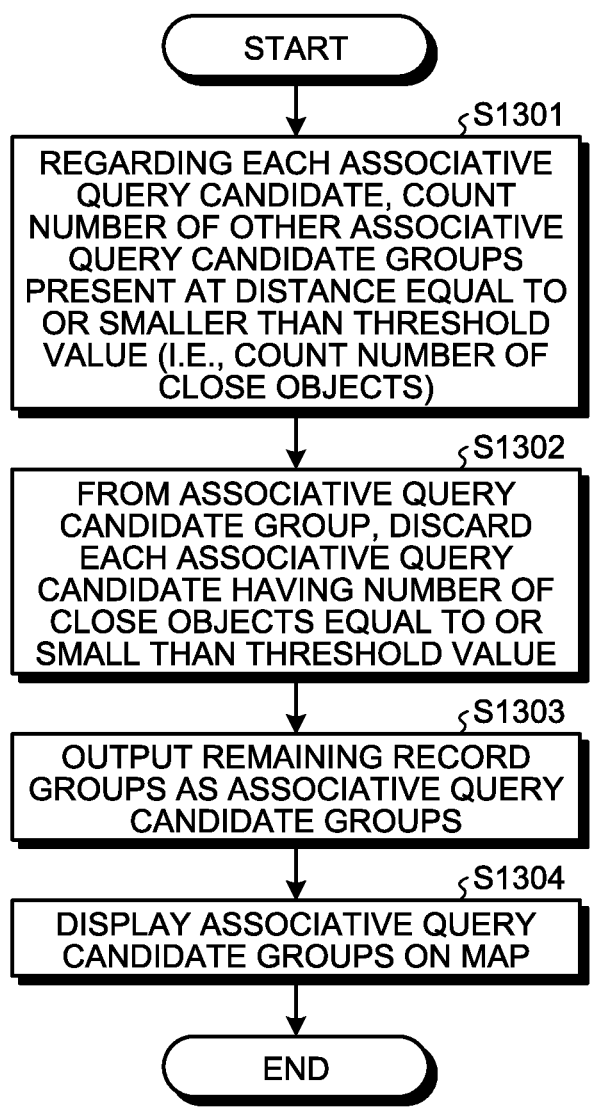
FIG. 18 is a flowchart for explaining another example of the filtering operation according to the second embodiment.

In the case of using hierarchical clustering, each object happens to belong to a single cluster at the most. However, the determination of identicalness of objects according to the similarity among feature vectors is stochastic in nature, and may include misclassification. In order to resolve this issue, a classification method can be implemented that enables an object to belong to a plurality of clusters. FIG. 18 is a flowchart for explaining an example of the filtering operation in the case in which a classification method is implemented that enables an object to belong to a plurality of clusters.

Regarding each associative query candidate, the classifying unit 103-2 counts the number of other associative query candidate groups present at the distance equal to or smaller than a threshold value (in the following explanation, called the number of close objects) (Step S1301). Then, the obtaining unit 102-2 discards, from the associative query candidate group, each associative query candidate having the number of close objects equal to or smaller than the threshold value (Step S1302).

The operations at Steps S1303 and S1304 are identical to the operations at Steps S503 and S504 illustrated in FIG. 8. Hence, that explanation is not repeated.

Figure 19:
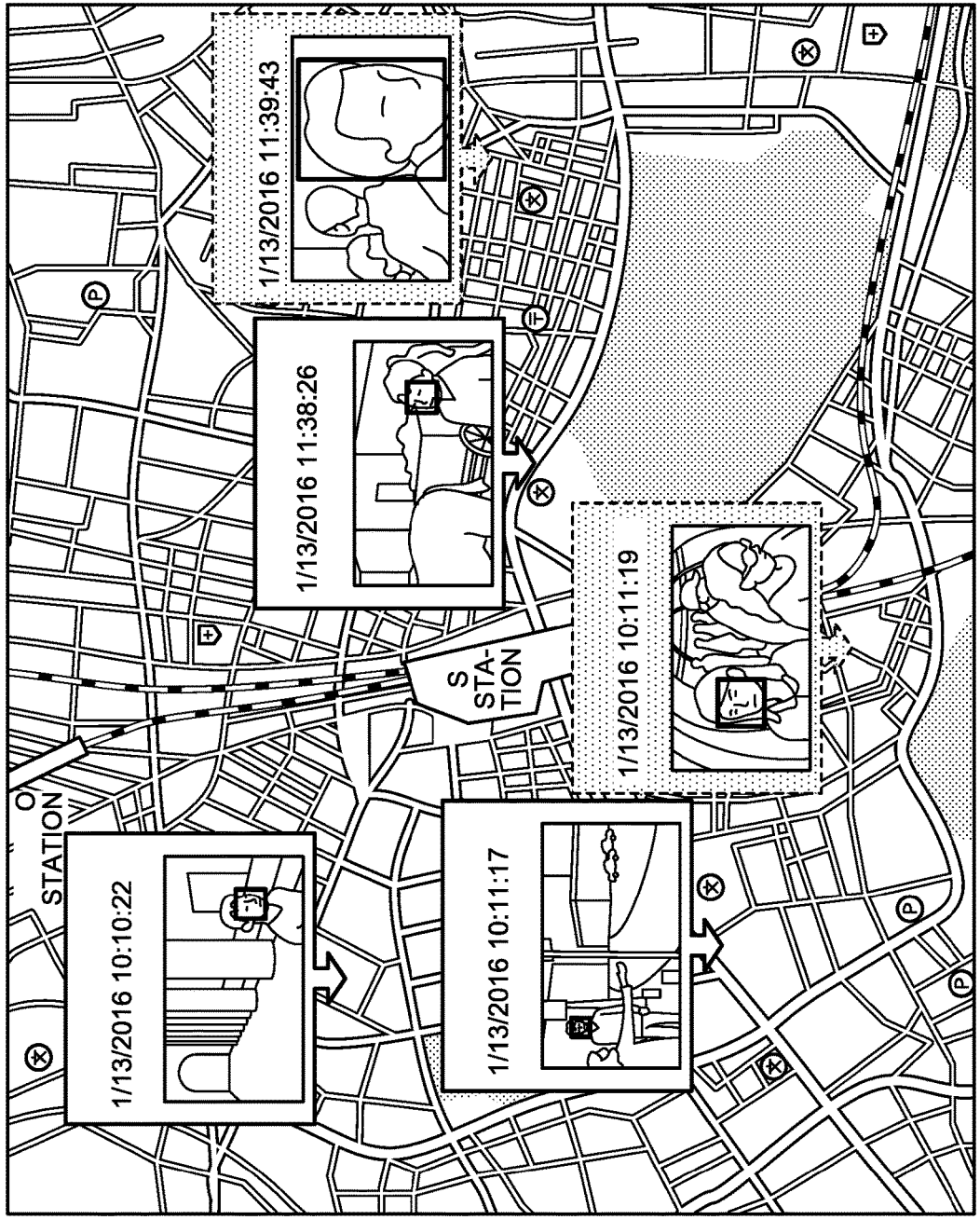
FIG. 19 is a diagram illustrating an example of a display screen according to the second embodiment.

FIG. 19 is a diagram illustrating an example of the display screen according to the second embodiment. Other than the fact that labels are not displayed, the display screen illustrated in FIG. 19 is identical to FIG. 10 illustrating the display screen according to the first embodiment. The overall flow of the map display operation is identical to that illustrated in FIG. 9. Hence, that explanation is not repeated.

Figure 20:
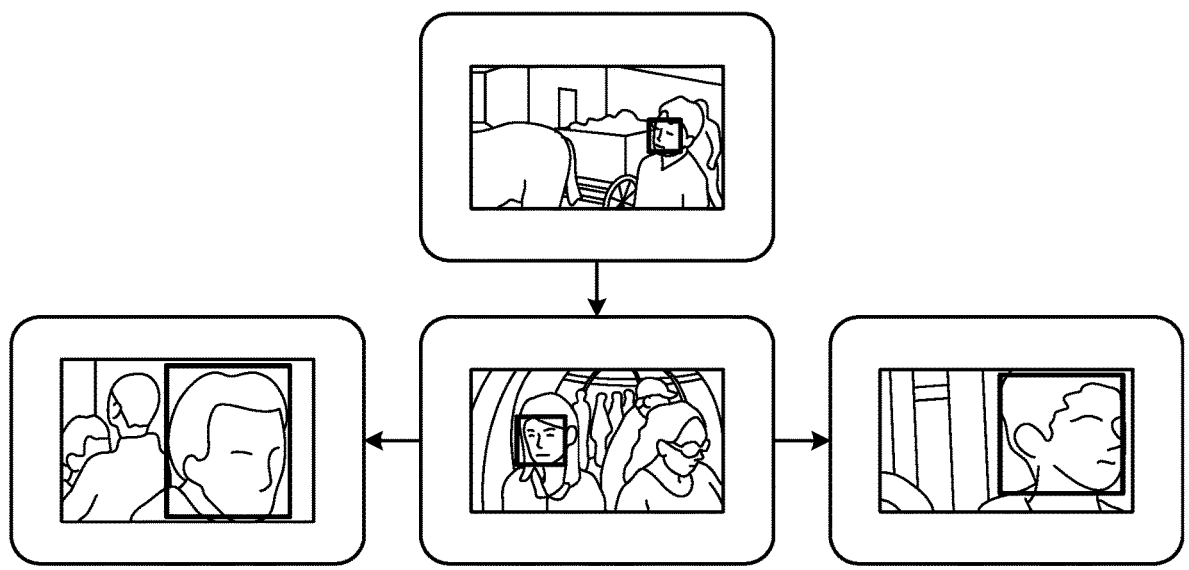
FIG. 20 is a diagram illustrating an exemplary object relationship diagram according to the second embodiment.

FIG. 20 is a diagram illustrating an exemplary object relationship diagram according to the second embodiment. As compared to FIG. 11 illustrating an object relationship diagram according to the first embodiment, the display screen illustrated in FIG. 20 differs in the way that object contents are included instead of labels. For example, in FIG. 20, the face images that served as the basis for generating feature vectors are used instead of labels. The overall flow of the operation for generating an object relationship diagram is identical to FIG. 11. Hence, that explanation is not repeated.

As described above, according to the first and second embodiments, it becomes possible to perform an associative search with respect to a data group to which attribute information representing at least one of positions (position information) and timings (timing information) is associated.

Figure 21:
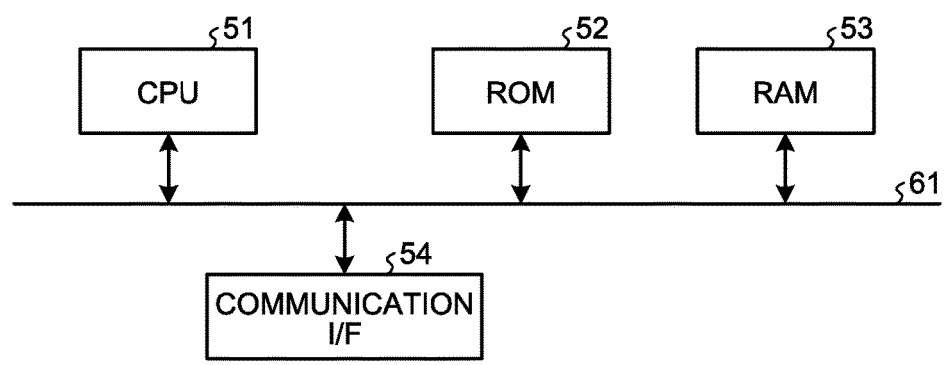
FIG. 21 is an explanatory diagram of an exemplary hardware configuration of the devices according to the first and second embodiments.

Explained below with reference to FIG. 21 is a hardware configuration of the devices (the retrieval device, the server device, and the PC) according to the first and second embodiments. FIG. 21 is an explanatory diagram of an exemplary hardware configuration of the devices according to the first and second embodiments.

The devices according to the first and second embodiments include a control device such as a central processing unit (CPU) 51; memory devices such as a read only memory (ROM) 52 and a random access memory (RAM) 53; a communication interface (I/F) 54 that establishes connection with a network and performs communication; and a bus 61 that connects the constituent elements to each other.

The computer programs executed in the devices according to the first and second embodiments are stored in advance in the ROM 52.

Alternatively, the computer programs executed in the devices according to the first and second embodiments can be recorded as installable or executable files in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer programs executed in the devices according to the first and second embodiments can be stored in a downloadable manner in a computer connected to a network such as the Internet. Still alternatively, the computer programs executed in the devices according to the first and second embodiments can be distributed over a network such as the Internet.

The computer programs executed in the devices according to the first and second embodiments can make a computer to function as the constituent elements of the devices. In the computer, the CPU 51 can read the computer programs from a computer-readable memory medium into a main memory device and execute the computer programs.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirits of the inventions.

What is claimed is:
1. A retrieval device comprising:
one or more hardware processors configured to:
search a memory, which is configured to store object data in which specific information identifying an object is held in a corresponding manner with attribute information indicating at least one of timing and a position, for first object data containing specified specific information or similar information to the specified specific information;
obtain, from the memory, a plurality of pieces of second object data each of which contains attribute information identical or similar to the attribute information included in the first object data and each of which contains specific information different than the specific information included in the first object data;
classify the obtained pieces of second object data into groups each of which includes the pieces of second object data having identicalness or similarity in the attribute information;
select, without being specified by a user, a group based on a number of the pieces of second object data classified therein;
obtain the pieces of second object data included in the selected group;
select one of the obtained pieces of second object data that is specified by the user; and
search the memory for third object data containing specific information identical or similar to the specific information included in the selected second object data, wherein
the one or more hardware processors are configured to discard the pieces of second object data having a number of close objects equal to or smaller than a first threshold value; and
a distance from each of the pieces of second object data to each of the corresponding close objects is equal to or smaller than a second threshold value.
2. The retrieval device according to claim 1, wherein
the specific information represents identification information identifying the object, and the one or more hardware processors are configured to search for first object data containing identification information identical to specified identification information.

3. The retrieval device according to claim 1, wherein
the specific information represents feature information indicating a feature of the object, and
the one or more hardware processors are configured to search for first object data containing feature information identical or similar to specified feature information.

4. The retrieval device according to claim 1, wherein the one or more hardware processors are configured to
count a number of the pieces of second object data classified therein for each of the groups; and
obtain the pieces of second object data included in a group having a higher number of the pieces of second object data classified therein as compared to other groups.

5. The retrieval device according to claim 4, wherein the one or more hardware processors are configured to obtain the pieces of second object data either included in a group having a higher number of the pieces of second object data classified therein than a threshold value or included in a predetermined number of groups in descending order of number of the pieces of second object data classified therein.

6. The retrieval device according to claim 1, wherein
the specific information represents identification information identifying the object, and
the one or more hardware processors are configured to classify the obtained pieces of second object data into groups each of which includes the pieces of second object data having identicalness in the identification information.

7. The retrieval device according to claim 1, wherein
the specific information represents feature information indicating a feature of the object, and
the one or more hardware processors are configured to classify the obtained pieces of second object data into groups each of which includes the pieces of second object data having identicalness or similarity in the feature information.

8. The retrieval device according to claim 1, wherein
the one or more hardware processors are configured to
generate information indicating a first object identified by the specific information included in the first object data,
generate information indicating a second object identified by specific information included in the second object data,
generate information in which the first object and the second object are associated, and
display the generated information on a display.

9. The retrieval device according to claim 8, wherein
the specific information represents identification information identifying the object,
the information indicating the first object represents identification information of the first object, and
the information indicating the second object represents identification information of the second object.

10. The retrieval device according to claim 8, wherein
the specific information represents feature information indicating a feature of the object,
the information indicating the first object represents information serving as a basis for generating feature information of the first object, and
the information indicating the second object represents information serving as a basis for generating feature information of the second object.

11. The retrieval device according to claim 1, wherein
the attribute information contains a position of an object, and
the one or more hardware processors are configured to
display, on a map corresponding to the position included in the first object data, information indicating a first object identified by the specific information included in the first object data, and
display, on a map corresponding to the position included in the second object data, information indicating a second object identified by the specific information included in the second object data.

12. The retrieval device according to claim 1, wherein the specific information is generated from an image in which the object is captured.

13. A retrieval method comprising:
searching a memory, which is configured to store object data in which specific information identifying an object is held in a corresponding manner with attribute information indicating at least one of timing and a position, for first object data containing specified specific information or similar information to the specified specific information;
obtaining, from the memory, a plurality of pieces of second object data each of which contains attribute information identical or similar to the attribute information included in the first object data and each of which contains specific information different than the specific information included in the first object data;
classifying the obtained pieces of second object data into groups each of which includes the pieces of second object data having identicalness or similarity in the attribute information;
selecting, without being specified by a user, a group based on a number of the pieces of second object data classified therein;
obtaining the pieces of second object data included in the selected group;
selecting one of the obtained pieces of second object data that is specified by the user; and
searching the memory for third object data containing specific information identical or similar to the specific information included in the selected second object data, wherein
the pieces of second object data are discarded based on a number of close objects being equal to or smaller than a first threshold value, and a distance from each of the pieces second object data to each of the corresponding close objects is equal to or smaller than a second threshold value.

14. A retrieval system comprising:
an information processing device; and
a retrieval device, wherein
the information processing device includes one or more hardware processors configured to transmit object data in which specific information identifying an object is held in a corresponding manner with attribute information indicating at least one of timing and a position, and
the retrieval device includes
one or more hardware processors configured to:
search a memory, which is configured to store the object data, for first object data containing specified specific information or similar information to the specified specific information, obtain, from the memory, a plurality of sets of second object data each of which contains attribute information identical or similar to the attribute information included in the first object data and each of which contains specific information different than specific information included in the first object data, classify the obtained pieces of second object data into groups each of which includes the pieces of second object data having identicalness or similarity in the entry information, select, without being specified by a user, a group based on a number of the pieces of second object data classified therein;

obtain the pieces of second object data included in the selected group, select one of the obtained pieces of second object data that is specified by the user, and search the memory for third object data containing specific information identical or similar to the specific information included in the selected second object data serving as the specified specific information wherein the pieces of second object data are discarded based on a number of close objects being equal to or smaller than a first threshold value, and a distance from each of the pieces of second object data to each of the corresponding close objects is equal to or smaller than a second threshold value.

15. The retrieval device according to claim 1, wherein the one or more hardware processors are configured to select one specified second object data from among the plurality of pieces of second object data.

16. The retrieval device according to claim 1, wherein the one or more hardware processors are configured to:
display the obtained pieces of second object data; and
select one second object data that is specified from the displayed pieces of second object data.

\* \* \* \* \*